United States Patent
Doup et al.

(10) Patent No.: US 10,648,405 B2
(45) Date of Patent: May 12, 2020

(54) TOOL TO PREDICT ENGINE LIFE USING RING WEAR AND FUEL BURNED

(71) Applicant: Cummins Inc., Columbus, IN (US)

(72) Inventors: Douglas C. Doup, Columbus, IN (US); Dan E. Richardson, Columbus, IN (US); Jeffrey K. Colvill, Columbus, IN (US); Stephen W. Brooks, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 16/488,751

(22) PCT Filed: Feb. 26, 2018

(86) PCT No.: PCT/US2018/019648
§ 371 (c)(1),
(2) Date: Aug. 26, 2019

(87) PCT Pub. No.: WO2018/157025
PCT Pub. Date: Aug. 30, 2018

(65) Prior Publication Data
US 2020/0049061 A1 Feb. 13, 2020

Related U.S. Application Data

(60) Provisional application No. 62/463,795, filed on Feb. 27, 2017.

(51) Int. Cl.
*F02B 77/08* (2006.01)
*G01M 13/005* (2019.01)
*G01M 15/05* (2006.01)

(52) U.S. Cl.
CPC ......... *F02B 77/083* (2013.01); *G01M 13/005* (2013.01); *G01M 15/05* (2013.01)

(58) Field of Classification Search
CPC ............................ G01M 13/005; G01M 15/05
See application file for complete search history.

(56) References Cited

U.S. PATENT DOCUMENTS

| 4,862,393 A * | 8/1989 | Reid ..................... F01M 11/10 |
| | | 701/29.5 |
| 5,258,930 A | 11/1993 | Fukuyoshi et al. |

(Continued)

FOREIGN PATENT DOCUMENTS

| EP | 2 390 742 | 11/2011 |
| EP | 2 400 466 A1 | 12/2011 |
| RU | 2191362 | 10/2002 |

OTHER PUBLICATIONS

Gurvich, I.B., "Engine Wear and Engine Life", Army Foreign Science and Technology Center, Charlottesville, VA, distributed by: National Technical Information Service, USDOC, AD-754 688, Nov. 29, 1972, 59 pages.

(Continued)

*Primary Examiner* — Manuel A Rivera Vargas
*Assistant Examiner* — Yaritza H Perez Bermudez
(74) *Attorney, Agent, or Firm* — Foley & Lardner LLP

(57) ABSTRACT

Systems, apparatuses, and methods disclosed provide for estimating the remaining life for an engine. The method includes determining a correlation between a quantity of burned fuel and a level of wear of a piston ring for an engine. The level of wear of the piston ring is indicative of a remaining life of the engine. The method also includes determining a current quantity of burned fuel by the engine, and determining the remaining life of the engine based on the correlation and the current quantity of burned fuel by the engine.

20 Claims, 8 Drawing Sheets

(56) References Cited

U.S. PATENT DOCUMENTS

| | | | |
|---|---|---|---|
| 6,067,498 A * | 5/2000 | Akiyama | F02D 41/222 |
| | | | 701/101 |
| 6,253,601 B1 | 7/2001 | Wang et al. | |
| 6,542,853 B1 * | 4/2003 | Murakami | F02B 77/08 |
| | | | 123/179.15 |
| 6,922,640 B2 | 7/2005 | Vezzu et al. | |
| 7,149,657 B2 | 12/2006 | Goebel et al. | |
| 8,600,917 B1 | 12/2013 | Schimert et al. | |
| 8,805,623 B2 | 8/2014 | Matsuno et al. | |
| 9,708,960 B2 * | 7/2017 | Hall | F02D 41/024 |
| 2007/0079651 A1 | 4/2007 | Denkmayr | |
| 2012/0062894 A1 | 3/2012 | Micali et al. | |
| 2015/0361840 A1 * | 12/2015 | Verdegan | B01D 35/143 |
| | | | 702/34 |
| 2018/0073382 A1 * | 3/2018 | Moxon | F04D 27/001 |

OTHER PUBLICATIONS

International Search Report and Written Opinion for International Application No. PCT/US2018/019648, dated May 25, 2018, 10 pages.

Wei et al., "Research on Service Life Prediction of Diesel Engine", Journal of Software Engineering, Department of Military Vehicle, Military Transportation College, 300161 Tianjin, China, Sep. 15, 2016, 15 pages.

\* cited by examiner

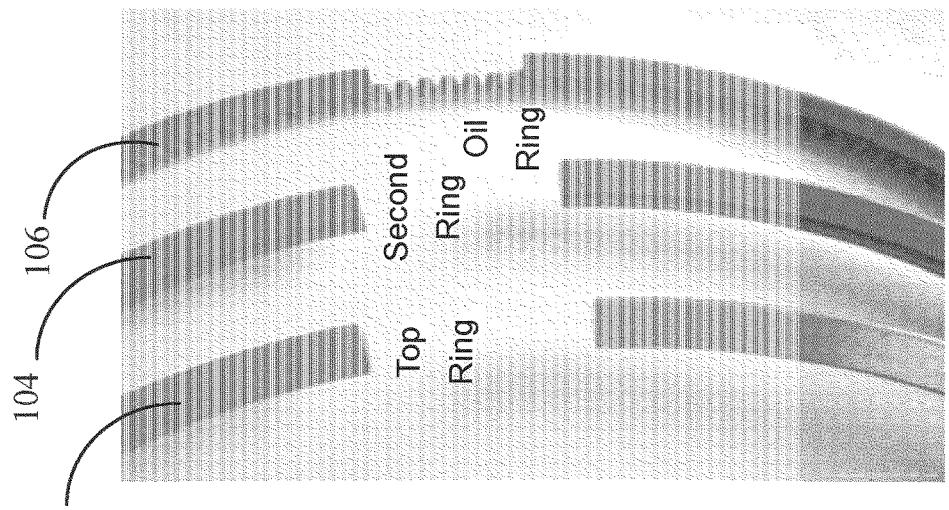
FIG. 1C
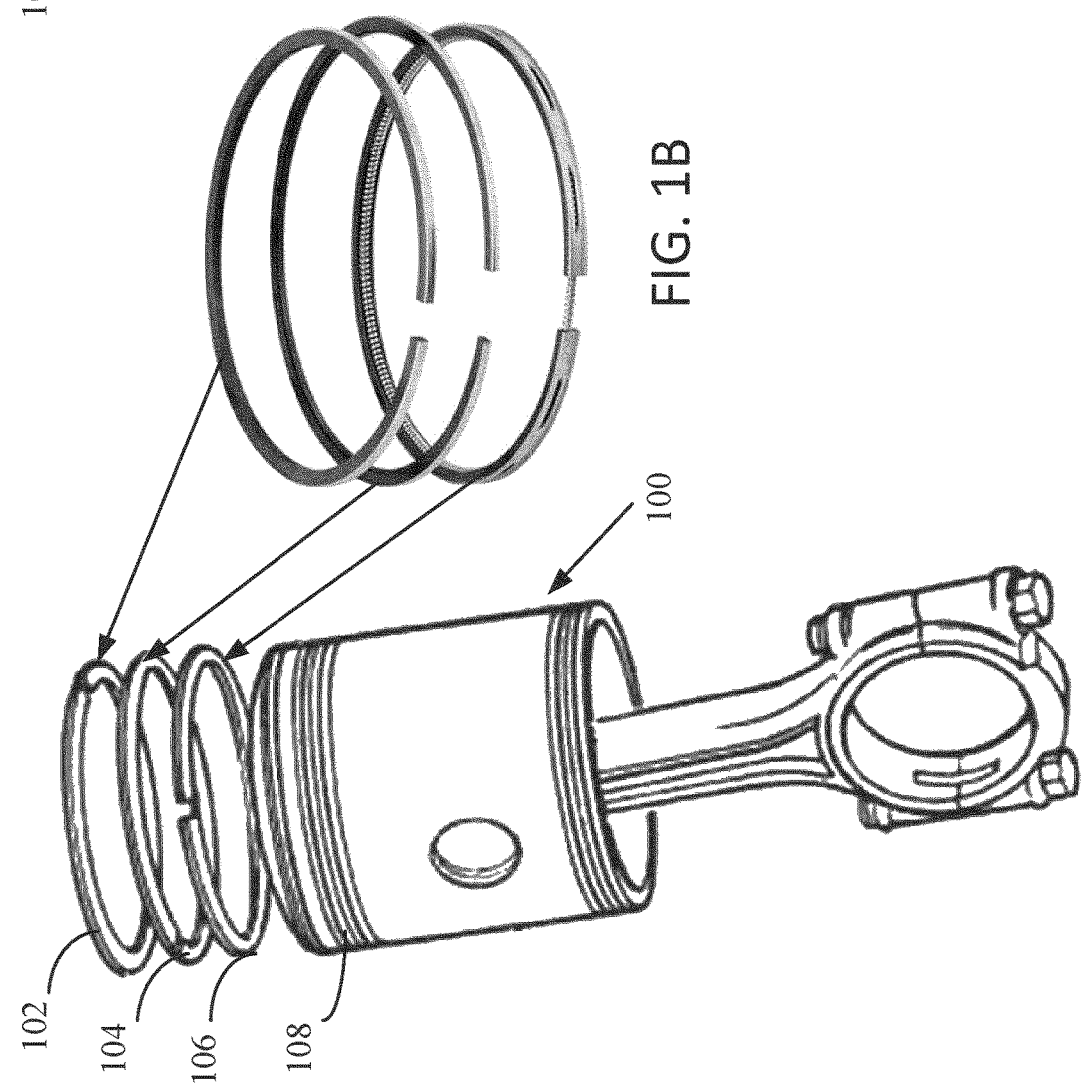
FIG. 1B
FIG. 1A

302

304

TOOL TO PREDICT ENGINE LIFE USING RING WEAR AND FUEL BURNED

TECHNICAL FIELD

The present disclosure relates to systems and methods of estimating the remaining life of an engine.

BACKGROUND

In various occasions, people want to know how long an engine will be able to function without any major repairs, for example, when estimating time for an engine overhaul or estimating residual value of the engine for trade in. Engine life relates to multiple factors, one of which is oil and/or blowby control. Traditional methods for predicting engine life are based on reactive processes. That is, actions are taken when blowby increase, low oil pressure, and/or fueling increase has been observed. Improvements on predicting remaining engine life are generally desired.

SUMMARY

One embodiment relates to an apparatus. The apparatus comprises a burned fuel determination circuit structured to determine a current quantity of burned fuel by an engine, and an estimated remaining life determination circuit structured to determine a remaining life of the engine based on the current quantity of burned fuel using a correlation between a quantity of burned fuel and a level of wear of a piston ring for the engine. The level of wear of the piston ring is indicative of the remaining life of the engine.

Another embodiment relates to a method. The method comprises determining a current quantity of burned fuel by an engine, and determining a remaining life of the engine based on the current quantity of burned fuel using a correlation between a quantity of burned fuel and a level of wear of a piston ring for the engine. The level of wear of the piston ring is indicative of a remaining life of the engine.

Yet another embodiment relates to a system. The system comprises a processing circuit structured to determine a current quantity of burned fuel by an engine and determine a remaining life of the engine based on the current quantity of burned fuel using a correlation between a quantity of burned fuel and a level of wear of a piston ring for the engine. The level of wear of the piston ring is indicative of a remaining life of the engine.

These and other features, together with the organization and manner of operation thereof, will become apparent from the following detailed description when taken in conjunction with the accompanying drawings.

BRIEF DESCRIPTION OF THE FIGURES

FIG. 1A is a perspective view of piston rings in relation to a piston, according to an example embodiment.

FIG. 1B is an enlarged perspective view of the piston rings of FIG. 1A.

FIG. 1C is a photograph of the piston rings of FIG. 1A and FIG. 1B.

DETAILED DESCRIPTION

Figure 2:
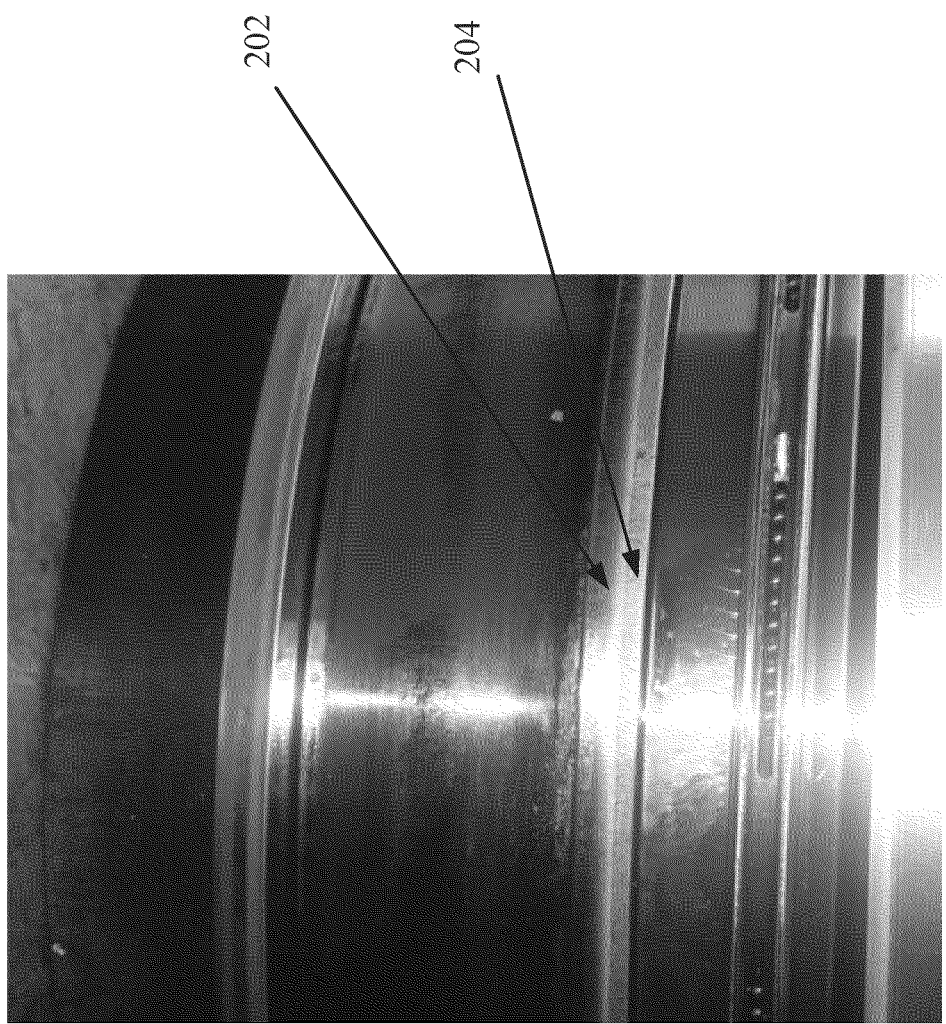
FIG. 2 is a photograph of a second compression ring with worn and unworn areas, according to an example embodiment.

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended, any alterations and further modifications in the illustrated embodiments, and any further applications of the principles of the disclosure as illustrated therein as would normally occur to one skilled in the art to which the disclosure relates are contemplated herein.

Referring to the Figures generally, the various embodiments disclosed herein relate to systems and methods of estimating the remaining life for an engine. In various occasions, people want to know how long an engine will be able to function without any major repairs, for example, when estimating time for an engine overhaul or estimating residual value of the engine for trade in. Engine life relates to multiple factors, one of which is oil and/or blowby control facilitated by piston rings of the engine. When a piston ring is excessively worn, the engine may need to be rebuilt or discarded. According to the disclosure herein, a correlation is established between the level of wear of the second compression ring on the piston and the quantity of fuel that has been burned by the engine. The level of ring wear is indicative of the remaining engine life. The correlation is established based on data collected during various tests and actual applications of engines of the same type. The quantity of burned fuel may be read from an engine control unit (ECU) associated with the engine or calculated based on the type of test. The level of ring wear is a level of face wear of the second compression ring, which may be measured by width of the wear marking. Study shows that during the initial "break-in" hours, the level of face wear changes non-linearly with the quantity of burned fuel. After the initial break-in hours, the level of face wear changes substantially linearly with the quantity of burned fuel. Remaining life of an engine at question may be estimated using the correlation and the quantity of fuel this engine has so far burned. The current quantity of fuel burned may be read from the ECU or customer fuel usage records. The remaining life of the engine may be presented as a percentage of a target life of the engine, remaining years the engine can operate, and/or remaining mileages a vehicle carrying the vehicle can run. The systems and methods disclosed herein may also be used to facilitate redefining the length of development for an engine.

Referring now to FIG. 1A, a perspective view of piston rings in relation to a piston is shown, according to an example embodiment. FIG. 1B is an enlarged perspective view of the piston rings of FIG. 1A. FIG. 1C is a photograph of the piston rings of FIG. 1A and FIG. 1B.

In some embodiments, there are three split piston rings 102, 104, and 106 in relation to a piston 100. Each of the piston rings 102, 104, and 106 may fit into a corresponding groove 108 on the outer diameter of the piston 100. The piston 100 may be used in a reciprocating engine such as an internal combustion engine (not illustrated in the present Figures) installed in, for example, a vehicle. The vehicle may be any type of passenger or commercial automobile, such as a car, truck, sport utility vehicle, cross-over vehicle, van, minivan, automobile, tractor. Moreover, the vehicle may include other types of vehicles such as a motorcycle, plane, helicopter, locomotive, or railway car.

Piston rings 102, 104, and 106 may facilitate the operation of the engine by sealing the engine cylinder, distributing lubricating oil on the cylinder wall, and transferring heat from the piston to the cylinder wall. In particular, the top ring 102 (also known as the first compression ring) may function as a barrier which maintains any pressure built up as the piston 100 arrives at the top of the stroke. Thus, the piston 100 may be prevented from losing pressure during the combustion process of the engine. The second ring 104 (also known as the second or secondary compression ring) may function as a backup compression ring. The oil ring 106 may work with the piston 100 to lubricate components of the engine (e.g., the cylinder, walls, pistons, rings, etc.) and cool the piston 100 by directing the lubricating oil around the piston 100. The oil ring 106 may also prevent the oil from seeping into the combustion chamber. It should be understood that the structures described with reference to FIGS. 1A-1C are for illustration not for limitation. The number of rings and their location may vary with the type and size of the piston 100.

Referring to FIG. 2, a photograph of a second compression ring with worn and unworn areas is shown, according to an example embodiment. The second compression ring 200 may correspond to the second ring 104 of FIG. 1. The second compression ring 200 is subject to face wear when it moves up and down the cylinder bore due to the inherent load and the gas load acting thereon. As shown in FIG. 2, an unworn area 202 on the second ring 200 has a dull surface while a worn area 204 has a shiny reflective surface.

Figure 3A:
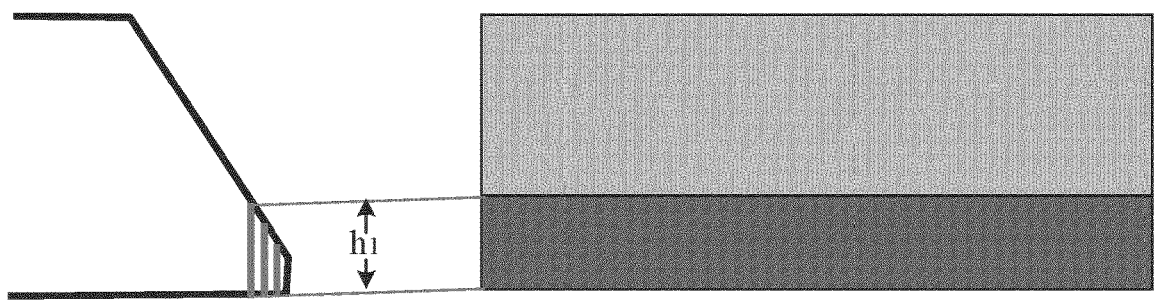
FIG. 3A is a schematic diagram of a pattern of normal ring wear, according to an example embodiment.
Figure 3B:
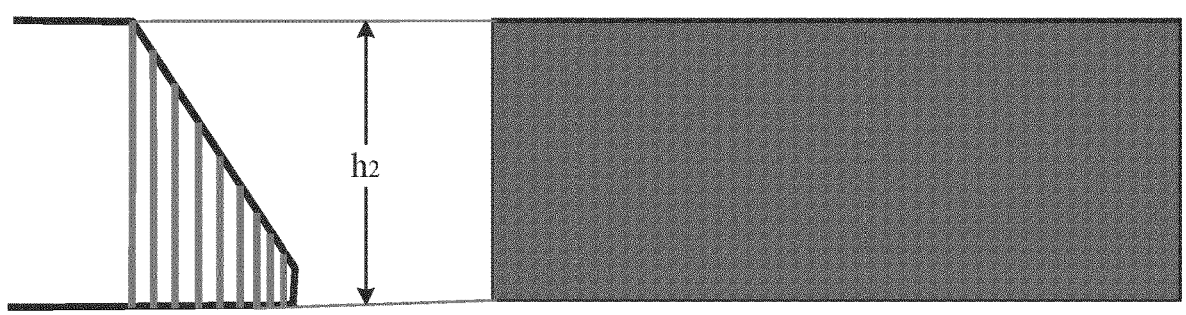
FIG. 3B is a schematic diagram of a pattern of excessive ring wear, according to an example embodiment.

Referring to FIG. 3A, a schematic diagram of a pattern 302 of normal ring wear is shown, according to an example embodiment. FIG. 3B shows a pattern 304 of excessive ring wear, according to an example embodiment. The level of face wear of the second compression ring is represented by a width of the wear marking, h. In the pattern 304 of excessive ring wear, the width of the wear marking $h_2$ may reach the total width of the second compression ring. In the pattern 302 of normal ring wear, the width of the wear marking $h_1$ is considerably smaller than the total width of the second compression ring. The level of ring wear may be defined as a ratio of $h_1/h_2$. The higher the ratio, the more the ring is worn. Face wear of the ring may be measured by width of the wear marking. Excessively worn second ring may cause problems and malfunction of the engine, such as excessive oil consumption, increased blowby, overall loss of power or poor performance, and/or the like. The engine may need to be rebuilt or discarded in these situations.

Figure 4:
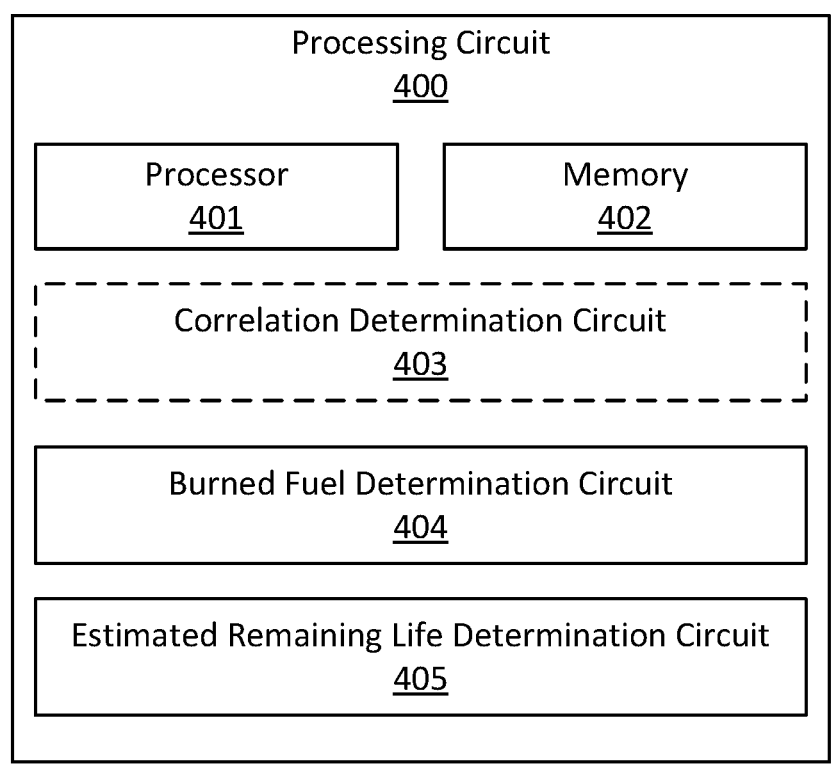
FIG. 4 is a schematic diagram of a processing circuit for estimating engine life, according to an example embodiment.

Referring to FIG. 4, a schematic diagram of a processing circuit 400 for estimating engine life is shown, according to an example embodiment. In some embodiments, the processing circuit 400 is implemented on an ECU associated with the engine. In other embodiments, the processing circuit 400 is implemented on a computing system separate from the ECU, for example, a server, a personal computer, a laptop, and/or the like. The processing circuit 400 includes a processor 401, a memory 402, optionally a correlation determination circuit 403, a burned fuel determination circuit 404, and an estimated remaining life determination circuit 405. Through the components, the processing circuit 400 is structured to determine a correlation between a quantity of burned fuel and a level of wear of a piston ring, determine a current quantity of burned fuel by the engine, and determine an estimated remaining life for the engine.

The processor 401 may be implemented as a general-purpose processor, an application specific integrated circuit (ASIC), one or more field programmable gate arrays (FPGAs), a digital signal processor (DSP), a group of processing components, or other suitable electronic processing components. The memory 402 may include one or more tangible, non-transient volatile memory or non-volatile memory, e.g., NVRAM, RAM, ROM, Flash Memory, hard disk storage, etc. Moreover, the memory 402 may include database components, object code components, script components, or any other type of information structure. The memory 402 may store data and/or computer code for facilitating the various processes described herein.

In one embodiment, the correlation determination circuit 403, the burned fuel determination circuit 404, and the estimated remaining life determination circuit 405 may utilize the processor 401 and/or memory 402 to accomplish, perform, or otherwise implement various actions described herein with respect to each particular circuit. In this embodiment, the processor 401 and/or memory 402 may be considered to be shared components across each circuit. In another embodiment, the circuits (or at least one of the circuits) may include their own dedicated processing circuit having a processor and a memory device. In this latter embodiment, the circuit may be structured as an integrated circuit or an otherwise integrated processing component. In yet another embodiment, the activities and functionalities of circuits may be embodied in the memory 402, or combined in multiple circuits, or as a single circuit. In this regard and while various circuits with particular functionality are shown in FIG. 4, it should be understood that the processing circuit 400 may include any number of circuits for completing the functions and activities described herein. For example, the activities of multiple circuits may be combined as a single circuit, as an additional circuit(s) with additional functionality, etc.

Certain operations of the processing circuit 400 described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

In some embodiments, the processing circuit 400 includes the correlation determination circuit 403 structured to determine a correlation between a quantity of burned fuel and a level of wear of a piston ring for an engine. In some embodiments, the processing circuit 400 does not include the correlation determination circuit 403, but uses a correlation already established (e.g., by another computing system) that is stored in the memory 402. The level of wear of the piston ring is indicative of a remaining life of the engine. In some embodiments, the correlation determination circuit 403 is structured to establish the correlation based on data of quantity of burned fuel relative to level of ring wear collected during various tests and/or actual applications. In further embodiments, the correlation determination circuit 403 is structured to calibrate the correlation.

As discussed above, when the second compression ring of the piston is worn out at 100% face wear, the engine may need to be rebuilt or discarded. Thus, the level of face wear of the second compression ring may be used to indicate the remaining life of the engine. In some embodiments, the remaining life may be represented by a percentage of a target life of the engine. For example, if the level of wear is 0, the remaining engine life is 100%. If the level of wear is 100%, the remaining engine life is 0%. When the level of wear is 50%, the remaining engine life is based on a % of established correlation, etc. In some embodiments, the remaining engine life may be represented by remaining years and/or remaining mileages before the engine has serious problems, or any suitable parameters determined using the level of ring wear.

The engine may be used in various applications, such as extra heavy duty application, heavy duty application, medium duty application, etc. Fuel may be burned at different rates for different applications. In some embodiments, the correlation is established based on data collected during various tests under various conditions. In some embodiments, the correlation is established based on data collected during actual applications. In some embodiments, the correlation is established based on data collected during both tests and actual application.

Figure 5:
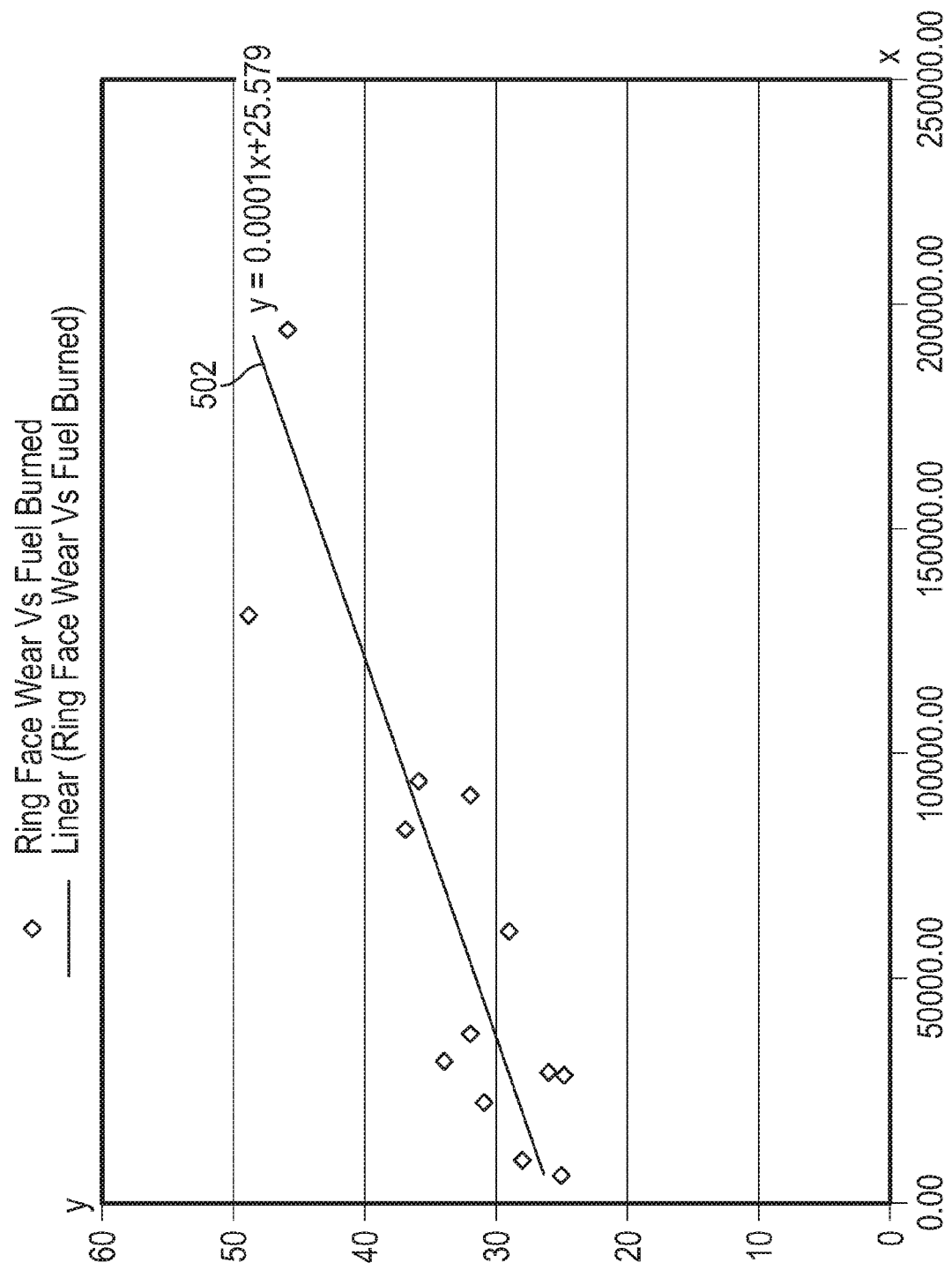
FIG. 5 is a graph showing data of quantity of burned fuel in relation to level of ring wear collected during tests and actual applications and a linear fitting of the data, according to an example embodiment.

Referring to FIG. 5, a graph illustrating the correlation between the level of piston ring wear and the quantity of burned fuel is shown, according to an example embodiment. The x-axis represents the quantify of burned fuel in pound (lb), and the y-axis represents the level of face wear of the second compression ring in percentage (%). The symbols "♦" represents data collected during various tests and actual applications of engines. Line 502 represents a linear fitting result for the collected data. The collected data are shown in Table 1.

TABLE 1

Data of fuel burned and level of face wear during tests and actual applications

| No. | Fuel Burned (Pounds) | Level of Ring Face Wear (%) | Description |
|---|---|---|---|
| 1 | 6009 | 25 | Actual application |
| 2 | 9490 | 28 | Actual application |
| 3 | 22353 | 31 | 500-hour SLT-1 test |
| 4 | 28291 | 25 | 250-hour Hotbox-KV1 test |
| 5 | 28897 | 26 | 250-hour Beta Hotbox test |
| 6 | 31243 | 34 | 250-hour Hotbox test |
| 7 | 37312 | 32 | Actual application |
| 8 | 60281 | 29 | Actual application |
| 9 | 83009 | 37 | 1000-hour Cycle-6 test |
| 10 | 90429 | 32 | Actual application |
| 11 | 93499 | 36 | 1500-hour Cycle-6-Steel test |
| 12 | 130327 | 49 | 1000-hour standard Endurance test |
| 13 | 193695 | 46 | 1500-hour Endurance-Steel test |

Figure 6:
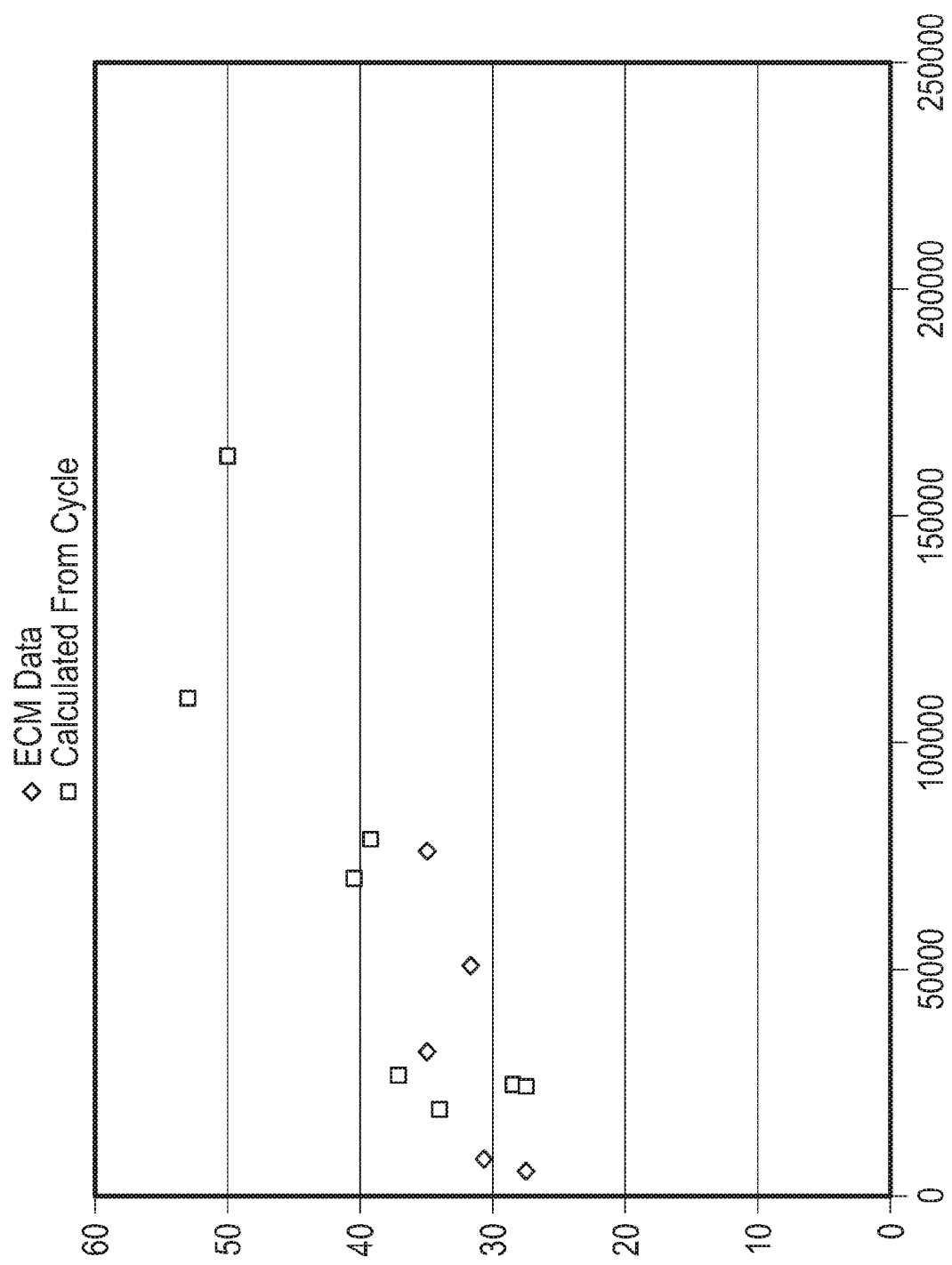
FIG. 6 is a graph showing data of quantity of burned fuel read from engine control unit (ECU) and calculated based on the type of test, according to an example embodiment.

For actual applications, the quantity of burned fuel may be read from the ECU of the corresponding engine. For tests, the data of fuel burned may be calculated based on the type of test. FIG. 6 shows data of quantity of burned fuel read from the ECU (represented by "♦") and data of quantity of burned fuel calculated based on the type of test (represented by "■"). For example, the 1000-hour Cycle-6 test (i.e., data No. 9) includes 4000 cycles, each of which includes 144 seconds of idle state burning fuel 0.12 lb/cycle, followed by 36 seconds torque peak state burning fuel 0.78 lb/cycle, followed by 360 seconds of advertised power state burning fuel 11.44 lb/cycle, followed by 36 seconds of high idle state burning fuel 0.26 lb/cycle, followed by 144 seconds of advertised power state burning fuel 4.58 lb/cycle, followed by 36 seconds of lug from advertised power to torque peak burning fuel 0.96 lb/cycle, followed by 108 seconds of torque peak state burning fuel 2.35 lb/cycle, and followed by 36 seconds of high idle state burning fuel 0.26 lb/cycle. Other tests (e.g., standard endurance test, hotbox test, SLT-1 test, etc.) include various combinations of operating states (e.g., idle state, torque peak state, advertised state, etc.) and the quantity of burned fuel can be calculated similarly.

The level of face wear of the second ring may be measured by width of the wear marking, as discussed above with reference to FIG. 3. Engine type and combustion recipe may influence the correlation. In some embodiments, the data are collected from tests/applications on engines of the same type/family.

A linear fitting was performed on the data collected, which gives the following correlation:

$$y = 0.0001x + 25.58 \quad (1),$$

wherein x represents the burned fuel in pound, and y represents the level of face wear of the second compression ring in percentage. Line 502 shows the correlation (1) in FIG. 5. As can be seen, the data collected fits well with the linear correlation regardless of the type of tests/applications.

Further studies show that the correlation may include two portions. When a brand new engine is put into use, the level of ring wear accelerates non-linearly with the quantity of burned fuel during the initial "break-in" hours (e.g., 50 hours) due to asperity contact and engine contamination. After the initial "break-in" hours, the level of ring wear changes substantially linearly with the quantity of burned fuel. The first portion of the correlation reflects the situation of the initial "break-in" hours. The second portion of the correlation reflects the situation after the initial "break-in" hours. The two-portion correlation is reflected in FIG. 7.

Figure 7:
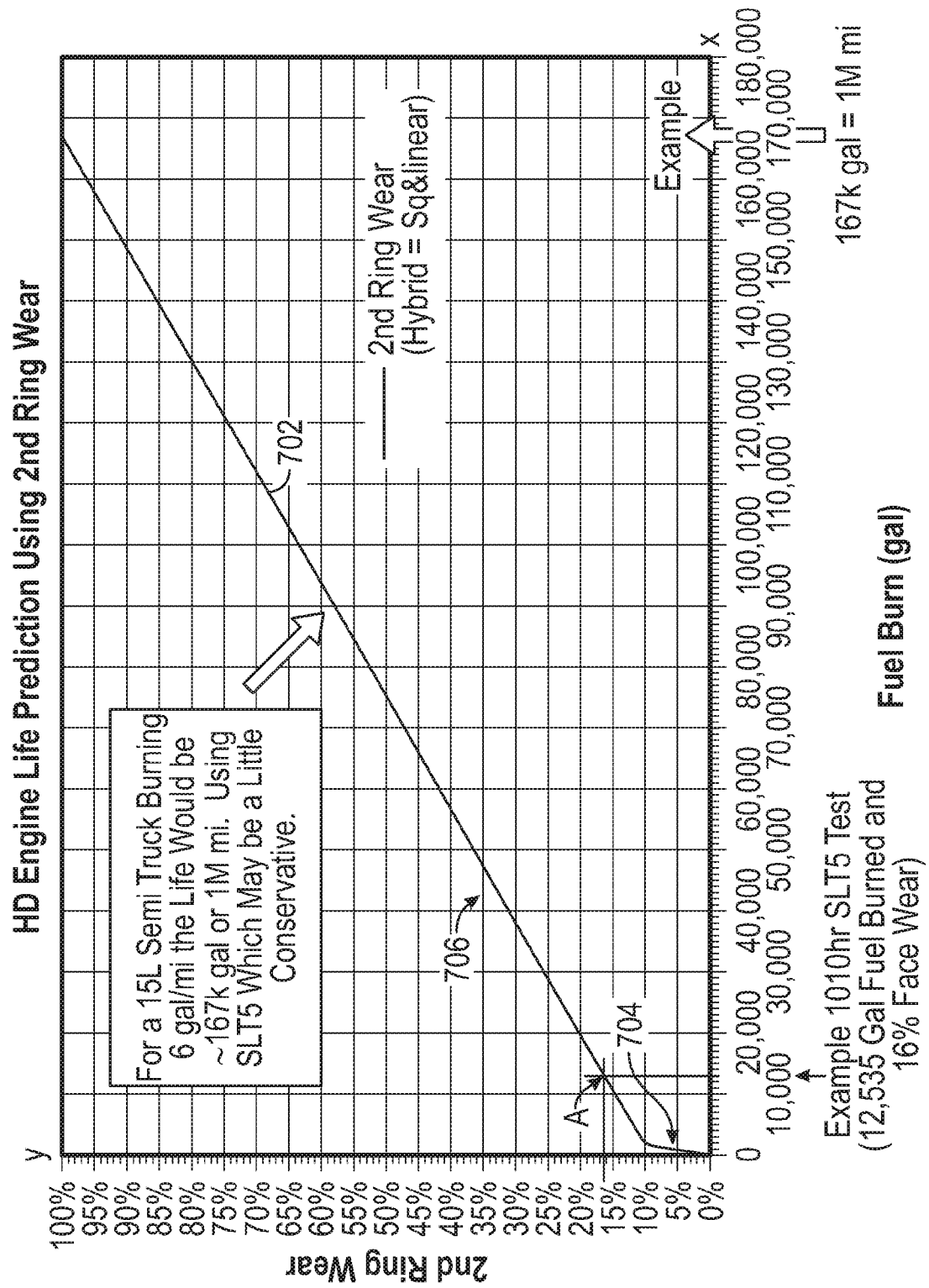
FIG. 7 is a graph showing correlation between the quantity of burned fuel and the level of ring wear, according to an example embodiment.

FIG. 7 shows a graph illustrating the correlation between the level of face wear of the second compression ring and the quantity of burned fuel, according to an example embodiment. The x-axis represents the quantify of burned fuel in gallon (gal), and the y-axis represents the level of face wear of the second compression ring in percentage (%). Curve 702 represents the correlation between the level of ring wear and the quantity of fuel burned.

The correlation was for an engine used on a heavy-duty vehicle. It was assumed that the target mileage for the life of the engine was 1,000,000 miles, the average speed of the heavy-duty vehicle was 48 miles/hour, the average miles per year was 67,000 miles, the rated engine speed was 1,800 rpm, and the average miles per gallon was 6 mi/gal. The correlation curve 702 includes a first portion 704 and a second portion 706. The first portion 704 reflects the correlation during the initial "break-in" hours, in which the level of ring wear is a square root function of the fuel burned relative to the total fuel burned for the target engine life. The non-linear correlation may be calculated as:

$$\text{Level of wear} \propto \sqrt{\frac{\text{Fuel burned}}{\text{Total fuel}}}. \quad (2)$$

For example, if the fuel burned so far is 1% of the total fuel burned for the total engine life, the level of ring wear is 10% (i.e., square root of 1%).

The second portion 706 reflects the correlation after the initial "break-in" hours, in which the level of ring wear changes substantially linearly with the fuel burned. The linear correlation may be calculated as:

$$\text{Level of wear} = \\ \textit{Sqrt wear} + \frac{\text{Additional fuel burned}}{\text{Total fuel} - \text{fuel for } \textit{Sqrt wear}} \times (1 - \textit{Sqrt wear}), \quad (3)$$

wherein Sqrt wear is the level of ring wear at the end of the first portion 704. Data of quantity of burned fuel and level of ring wear is shown in Table 2. The third column of Table 2 (i.e., Second ring wear (Square root)) was the level of ring wear calculated using equation (2). The fifth column of Table 2 (i.e., Second ring wear (Hybrid)) was the level of ring wear calculated using equation (3).

Example

TABLE 2

Correlation between level of ring wear and fuel burned

| Fuel burned (Gallon) | Mileage | Second ring wear (Square root) | Second ring wear (Square linear) | Second ring wear (Hybrid) |
|---|---|---|---|---|
| 0 | 0 | 0% | 0% | 0% |
| 1,528 | 9,168 | 10% | 1% | 10% |
| 5,000 | 30,000 | 17% | 3% | 12% |
| 10,000 | 60,000 | 24% | 6% | 15% |
| 15,000 | 90,000 | 30% | 9% | 18% |
| 20,000 | 120,000 | 35% | 12% | 20% |
| 25,000 | 150,000 | 39% | 15% | 23% |
| 30,000 | 180,000 | 42% | 18% | 26% |
| 35,000 | 210,000 | 46% | 21% | 28% |
| 40,000 | 240,000 | 49% | 24% | 31% |
| 45,000 | 270,000 | 52% | 27% | 34% |
| 50,000 | 300,000 | 55% | 30% | 37% |
| 55,000 | 330,000 | 57% | 33% | 39% |
| 60,000 | 360,000 | 60% | 36% | 42% |
| 65,000 | 390,000 | 62% | 39% | 45% |
| 70,000 | 420,000 | 65% | 42% | 47% |
| 75,000 | 450,000 | 67% | 45% | 50% |
| 80,000 | 480,000 | 69% | 48% | 53% |
| 85,000 | 510,000 | 71% | 51% | 56% |
| 90,000 | 540,000 | 73% | 54% | 58% |
| 95,000 | 570,000 | 75% | 57% | 61% |
| 100,000 | 600,000 | 77% | 60% | 64% |
| 105,000 | 630,000 | 79% | 63% | 66% |
| 110,000 | 660,000 | 81% | 66% | 69% |
| 115,000 | 690,000 | 83% | 69% | 72% |
| 120,000 | 720,000 | 85% | 72% | 75% |
| 125,000 | 750,000 | 87% | 75% | 77% |
| 130,000 | 780,000 | 88% | 78% | 80% |
| 135,000 | 810,000 | 90% | 81% | 83% |
| 140,000 | 840,000 | 92% | 84% | 85% |
| 145,000 | 870,000 | 93% | 87% | 88% |
| 150,000 | 900,000 | 95% | 90% | 91% |
| 155,000 | 930,000 | 96% | 93% | 94% |
| 160,000 | 960,000 | 98% | 96% | 96% |
| 166,677 | 1,000,000 | 100% | 100% | 100% |

For any given quantity of fuel burned, the corresponding level of ring wear and thus the remaining engine life can be determined using FIG. 7 or Table 2. For example, for a 1010-hour SLV-5 test, the fuel burned is 12,535 gallons, and the corresponding level of ring wear is 16% (See point A on curve 706). Or, the level of ring wear may be obtained by interpolation using Table 2. In some embodiments, the correlation may be calibrated.

Referring back to FIG. 4, the burned fuel determination circuit 404 is structured to determine a current quantity of fuel that the engine has burned so far. In some embodiments, the current quantity of fuel burned may be read from an ECU associated with the engine. In some embodiments, the current quantity of fuel burned may be determined based fuel usage record(s) kept by, for example, a user.

The estimated remaining life determination circuit 405 is structured to determine an estimated remaining life for the engine based on the correlation determined by the correlation determination circuit 403 (or the established correlation stored in the memory 402) and the current quantity of burned fuel determined by the burned fuel determination circuit 404. In some embodiments, equation(s) for the correlation (e.g., equations (2) and (3)) may be stored in the memory 402. When the current quantity of fuel burned is determined, the estimated remaining life determination circuit 405 may use the stored equation(s) to determine the level of ring wear, which is indicative of the remaining life of the engine. In some embodiments, a look-up table for the correlation (e.g., Table 2) may be stored in the memory 402. When the current quantity of fuel burned is determined, the estimated remaining life determination circuit 405 may find the corresponding level of ring wear using the look-up table. In further embodiments, the remaining engine life may be presented as a percentage of the target engine life (e.g., 60% of engine life). In some embodiments, the remaining engine life may be presented as mileages the vehicle carrying the engine can run before reaching the target mileage. In some embodiments, the remaining engine life may be presented as years of the engine/vehicle can operate before reaching the target product year.

Figure 8:
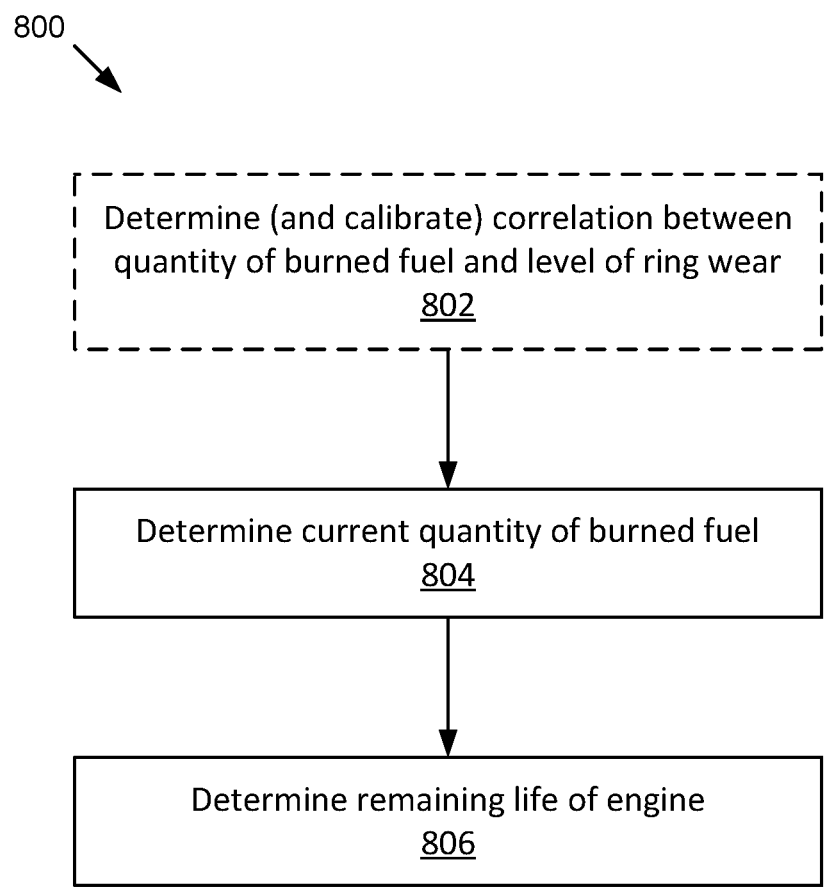
FIG. 8 is a flow diagram of a method for estimating engine life, according to an example embodiment.

Referring now to FIG. 8, a flow diagram of a method 800 for estimating the remaining life of an engine is shown according to one embodiment. The method 800 may be executed by the processing circuit 400 implemented on an ECU associated with the engine, or a computing system separate from the ECU, such as a computer, a server, a laptop, etc.

At an optional process 802, a correlation between a level of wear of a piston ring and a quantity of burned fuel is determined. In some embodiments, the method 800 includes the process 802 for determining the correlation. In some embodiments, the method 800 does not includes determining the correlation, but uses an existing correlation (e.g., established by another computing system). The level of ring wear is indicative of the remaining life of the engine. In some embodiments, the piston ring is the second compression ring fitting into a groove on an outer diameter of a piston of the engine. In some embodiments, the level of wear is the level of surface wear of the second compression ring. In some embodiments, the correlation is determined based on data collected during tests and/or actual application of engine(s) of the same type/family.

In further embodiments, the correlation includes a first portion and a second portion. The first portion corresponds to correlation during the initial "break-in" hours of engine operation, in which the level of ring wear is a non-linear function of the fuel burned. The second portion corresponds to the correlation after the initial "break-in" hours, in which the level of ring wear is substantially a liner function of the fuel burned. In some embodiments, the correlation is calibrated.

At process 804, a current quantity of fuel burned is determined. In some embodiments, the current quantity of fuel burned may be read from an ECU associated with the engine. In some embodiments, the current quantity of fuel burned may be determined based on fuel usage record(s) kept by, for example, a user.

At process 806, an estimated remaining life for the engine is determined based on the correlation determined at process 802 (or the correlation stored in the memory 402) and the current quantity of fuel determined at process 804. In some embodiments, the estimated remaining life is determined using equation(s) for the correlation (e.g., equations (2) and (3)). In some embodiments, the estimated remaining life is determined using a look-up table for the correlation (e.g., Table 2). In various embodiments, the remaining life may be presented as a percentage of the target engine life, as mileages the vehicle carrying the engine can run before reaching the target mileage, or as years of the engine/vehicle can operate before reaching the target life.

It should be understood that no claim element herein is to be construed under the provisions of 35 U.S.C. § 112(f), unless the element is expressly recited using the phrase "means for." The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams. Further, reference throughout this specification to "one embodiment", "an embodiment", "an example embodiment", or similar language means that a particular feature, structure, or characteristic described in connection with the embodiment is included in at least one embodiment of the present invention. Thus, appearances of the phrases "in one embodiment", "in an embodiment", "in an example embodiment", and similar language throughout this specification may, but do not necessarily, all refer to the same embodiment.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as circuits, in order to more particularly emphasize their implementation independence. For example, a circuit may be implemented as a hardware circuit comprising custom very-large-scale integration (VLSI) circuits or gate arrays, off-the-shelf semiconductors such as logic chips, transistors, or other discrete components. A circuit may also be implemented in programmable hardware devices such as field programmable gate arrays, programmable array logic, programmable logic devices or the like.

As mentioned above, circuits may also be implemented in machine-readable medium for execution by various types of processors, such as the processing circuit 400 of FIG. 4. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

The computer readable medium (also referred to herein as machine-readable media or machine-readable content) may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. As alluded to above, examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus, comprising:
 a burned fuel determination circuit structured to determine a current quantity of burned fuel by an engine; and
 an estimated remaining life determination circuit structured to determine a remaining life of the engine based on the current quantity of burned fuel using a correlation between a quantity of burned fuel and a level of wear of a piston ring for the engine, wherein the level of wear of the piston ring is indicative of the remaining life of the engine.

2. The apparatus of claim 1, wherein the piston ring is a second compression ring fitting into a groove on an outer diameter of a piston of the engine, and wherein the level of wear of the piston ring is a level of surface wear of the second compression ring.

3. The apparatus of claim 1, further comprising:
 a correlation determination circuit structured to determine the correlation between the quantity of burned fuel and the level of wear of the piston ring for the engine.

4. The apparatus of claim 3, wherein the determining the correlation comprises establishing the correlation based on data collected during operation of engines of same type as the engine, and wherein the data includes the quantity of burned fuel in relation to the level of wear of the piston ring.

5. The apparatus of claim 4, wherein the quantity of burned fuel is determined based on data from an engine control unit (ECU) or data from a fuel usage record.

6. The apparatus of claim 4, wherein the level of wear of the piston ring is measured by using a width of wear marking of the piston ring.

7. The apparatus of claim 1, wherein the correlation includes a first portion in which the level of wear of the piston ring changes non-linearly with the quantity of burned fuel and a second portion in which the level of wear of the piston ring changes linearly with the quantity of burned fuel.

8. A method, comprising:
 determining a current quantity of burned fuel by an engine; and
 determining a remaining life of the engine based on the current quantity of burned fuel using a correlation between a quantity of burned fuel and a level of wear of a piston ring for the engine, wherein the level of wear of the piston ring is indicative of the remaining life of the engine.

9. The method of claim 8, wherein the piston ring is a second compression ring fitting into a groove on an outer diameter of a piston of the engine, and wherein the level of wear of the piston ring is a level of surface wear of the second compression ring.

10. The method of claim 8, further comprising determine the correlation between the quantity of burned fuel and the level of wear of the piston ring for the engine.

11. The method of claim 10, wherein the determining the correlation comprises establishing the correlation based on data collected during operation of engines of same type as the engine, and wherein the data includes the quantity of burned fuel in relation to the level of wear of the piston ring.

12. The method of claim 11, further comprising determining the quantity of burned fuel based on data from an engine control unit (ECU) or data from a fuel usage record.

13. The method of claim 11, further comprising measuring the level of wear of the piston ring using a width of wear marking of the piston ring.

14. The method of claim 8, wherein the correlation includes a first portion in which the level of wear of the piston ring changes non-linearly with the quantity of burned fuel and a second portion in which the level of wear of the piston ring changes linearly with the quantity of burned fuel.

15. A system comprising:
 a processing circuit structured to:
  determine a current quantity of burned fuel by an engine; and
  determine a remaining life of the engine based on the current quantity of burned fuel using a correlation between a quantity of burned fuel and a level of wear of a piston ring for the engine, wherein the level of wear of the piston ring is indicative of the remaining life of the engine.

16. The system of claim 15, further comprising a piston and a second compression ring fitting into a groove on an outer diameter of the piston, wherein the level of wear of the piston ring is a level of surface wear of the second compression ring.

17. The system of claim 15, wherein the processing circuit is further structured to determine the correlation between the quantity of burned fuel and the level of wear of the piston ring based on data collected during operation of engines of same type as the engine, and wherein the data includes the quantity of burned fuel in relation to the level of wear of the piston ring.

18. The system of claim 17, wherein the quantity of burned fuel is determined based on data from an engine control unit (ECU) or data from a fuel usage record.

19. The system of claim 17, wherein the level of wear of the piston ring is measured by a width of wear marking of the piston ring.

20. The system of claim 15, wherein the correlation includes a first portion in which the level of wear of the piston ring changes non-linearly with the quantity of burned fuel and a second portion in which the level of wear of the piston ring changes linearly with the quantity of burned fuel.

* * * * *